(12) United States Patent
Meurer

(10) Patent No.: US 12,187,547 B2
(45) Date of Patent: Jan. 7, 2025

(54) METHOD AND SYSTEM FOR CONTROLLING THE MATERIAL FLOW OF OBJECTS IN A CONVEYOR SYSTEM OF A REAL WAREHOUSE

(71) Applicant: Dematic GmbH, Heusenstamm (DE)

(72) Inventor: Hans Christoph Meurer, Alzey (DE)

(73) Assignee: Dematic GmbH, Heusenstamm (DE)

( * ) Notice: Subject to any disclaimer, the term of this patent is extended or adjusted under 35 U.S.C. 154(b) by 812 days.

(21) Appl. No.: 17/297,601

(22) PCT Filed: Nov. 20, 2019

(86) PCT No.: PCT/EP2019/081995
§ 371 (c)(1),
(2) Date: May 27, 2021

(87) PCT Pub. No.: WO2020/109116
PCT Pub. Date: Jun. 4, 2020

(65) Prior Publication Data
US 2022/0024696 A1    Jan. 27, 2022

(30) Foreign Application Priority Data

Nov. 28, 2018 (DE) .......................... 102018130206.1

(51) Int. Cl.
*B65G 43/08* (2006.01)
*B65G 1/137* (2006.01)

(52) U.S. Cl.
CPC .......... *B65G 43/08* (2013.01); *B65G 1/1371* (2013.01); *B65G 2203/0233* (2013.01); *B65G 2203/041* (2013.01)

(58) Field of Classification Search
CPC .................. B65G 43/08; B65G 1/1371; B65G 2203/0233; B65G 2203/041; G06Q 10/08; G05B 19/41885
See application file for complete search history.

(56) References Cited

U.S. PATENT DOCUMENTS 7,721,212 B2 * 5/2010 Alfandary ............ G06Q 10/087
715/965
9,102,055 B1   8/2015 Konolige et al.
(Continued)

FOREIGN PATENT DOCUMENTS

CN    206885957 U    1/2018
CN    207783009 U    8/2018
(Continued)

OTHER PUBLICATIONS

International Search Report of the International Searching Authority from corresponding Patent Cooperation Treaty (PCT) Application No. PCT/EP2019/081995 and English translation, indicated completed on Jan. 23, 2020.
(Continued)

Primary Examiner — Timothy R Waggoner
(74) Attorney, Agent, or Firm — Gardner, Linn, Burkhart & Ondersma LLP

(57) ABSTRACT

A method for controlling the material flow of goods to be conveyed in a conveyor system of a real warehouse by a virtual three-dimensional model, for which purpose the conveyor system of the real warehouse is virtualized in a central computer, for which purpose a virtual three-dimensional model of the real conveyor system having the dimensions of the individual conveyor components and the movement parameters thereof, including the actuator properties and the identity, shape and position of the goods to be conveyed, is stored, and the conveyor system of the real warehouse is centrally controlled from the virtual model, images of the goods to be conveyed in the real conveyor system are cyclically captured by sensors, and the virtual model is cyclically compared with the reality on the basis of the recorded images.

18 Claims, 2 Drawing Sheets

(56) References Cited

U.S. PATENT DOCUMENTS

| | | | |
|---|---|---|---|
| 9,607,285 | B1 | 3/2017 | Wellman |
| 9,771,222 | B2 | 9/2017 | Schroader |
| 10,496,061 | B2 | 12/2019 | Strohmenger et al. |
| 10,773,897 | B2 | 9/2020 | Schroader |
| 2009/0198371 | A1 | 8/2009 | Emanuel et al. |
| 2012/0303336 | A1 | 11/2012 | Becker |
| 2014/0143065 | A1* | 5/2014 | Mc Dermott ...... G06Q 30/0607 705/26.25 |
| 2014/0236555 | A1 | 8/2014 | Magato et al. |
| 2016/0221762 | A1 | 8/2016 | Schroader |
| 2016/0274553 | A1* | 9/2016 | Strohmenger ......... G05B 17/02 |
| 2016/0274978 | A1 | 9/2016 | Strohmenger et al. |
| 2016/0277715 | A1* | 9/2016 | Mankovskii .............. G06T 7/55 |
| 2017/0080566 | A1 | 3/2017 | Stubbs et al. |
| 2018/0046169 | A1 | 2/2018 | Shimamura et al. |
| 2018/0131907 | A1* | 5/2018 | Schmirler ............ H04N 23/698 |
| 2019/0156086 | A1* | 5/2019 | Plummer ................ G06T 7/248 |
| 2020/0241513 | A1 | 7/2020 | Yoshikawa |

FOREIGN PATENT DOCUMENTS

| | | |
|---|---|---|
| CN | 108726070 A | 11/2018 |
| DE | 60206199 T2 | 6/2006 |
| DE | 102006015689 A1 | 10/2007 |
| DE | 102009053292 A1 | 5/2011 |
| DE | 102017110861 A1 | 11/2018 |
| EP | 2183175 B1 | 12/2010 |
| EP | 3009984 A1 | 4/2016 |
| EP | 3330201 A1 | 6/2018 |
| EP | 3070550 B1 | 7/2018 |
| RU | 181803 U1 | 7/2018 |
| WO | 2016108937 A1 | 7/2016 |

OTHER PUBLICATIONS

International Written Opinion of the International Searching Authority from corresponding Patent Cooperation Treaty (PCT) Application No. PCT/EP2019/081995, indicated completed on Jan. 23, 2020.

Wikipedia webpage entitled "Speicherprogrammierbare Steuerung" in German dated Sep. 19, 2018, along with English machine translation of article accessed May 27, 2021.

Article entitled "Decentralized Control of a Material Flow System Enabled by an Embedded Computer Vision System" (Communications Workshops (ICC), 2011 IEEE International Conference on, 20110605 IEEE—ISBN 978-1-61284-954-6; ISBN 1-61284-954-7).

Commonly Assigned Co-Pending U.S. Appl. No. 17/258,828 as filed.

Preliminary Report on Patentability of the International Searching Authority in English from corresponding Patent Cooperation Treaty (PCT) Application No. PCT/EP2019/081995, completed May 25, 2021.

Article entitled "Sensor data and information fusion to construct digital-twins virtual machine tools for cyber-physical manufacturing" by Cai et al., published 2017, www.sciencedirect.com.

* cited by examiner

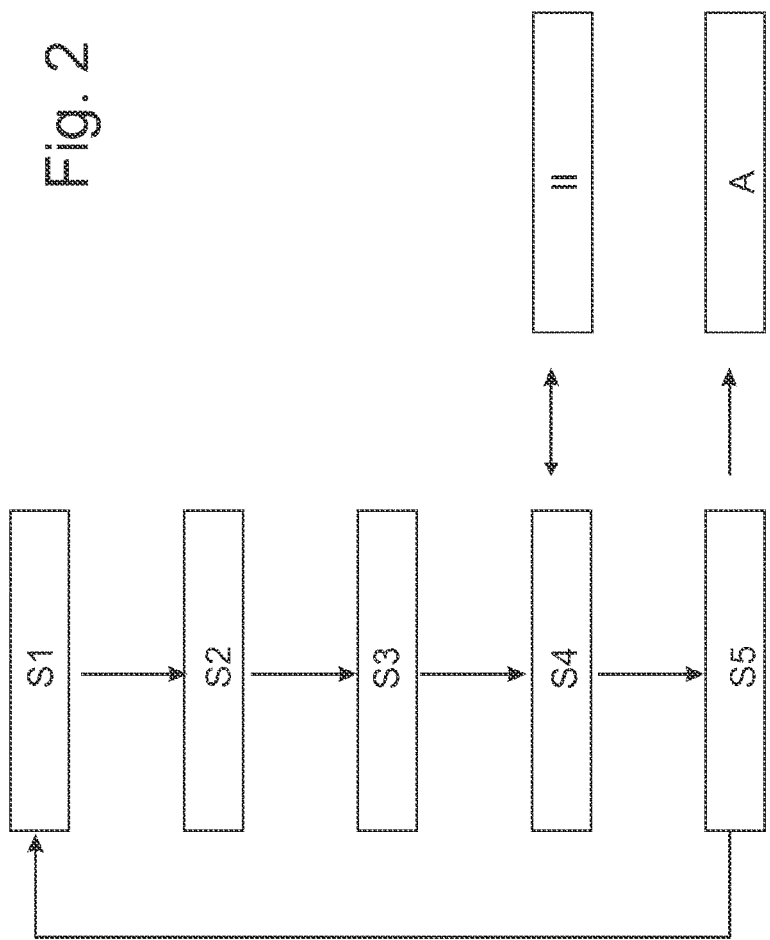

METHOD AND SYSTEM FOR CONTROLLING THE MATERIAL FLOW OF OBJECTS IN A CONVEYOR SYSTEM OF A REAL WAREHOUSE

CROSS REFERENCE TO RELATED APPLICATION

The present invention claims the priority benefits of International Patent Application No. PCT/EP2019/081995, filed Nov. 20, 2019, and claims benefit of German patent application DE 10 2018 130 206.1, filed on Nov. 28, 2018.

BACKGROUND AND FIELD OF THE INVENTION

The invention relates to a method for controlling the material flow of objects in a conveyance technique of a real warehouse.

In the case of warehouses within the field of internal logistics or supply and distribution centers etc., it is generally known to control and regulate the material flow of items on the conveyance techniques through the use of local sensors and local decentralized controls (PLCs) which recognize or determine the items and their position.

For instance, in order to actuate drives in such conveyance techniques (actuators) the position of the goods being conveyed (items) must be reliably determined. This takes place typically with the aid of light barriers and light scanners (sensors). To a limited extent, the position of the goods being conveyed is also calculated using known conveyance times since the last position status message (e.g. tracking). The goods being conveyed are identified mostly by reading barcodes or other markings (scanners).

For instance, EP 3 009 984 A1 describes the optical recognition of optical codes by means of image recognition of the codes and comparison of movement vectors.

Movements of the material flow equipment or conveyance techniques are triggered on the basis of status messages from the sensors mostly in a decentralized manner via control computers, so-called programmable logic controllers (PLCs). Therefore, this requires a considerable amount of outlay. The outlay for actuating the actuators includes sensors including their cabling for the supply of current, the data connection of all sensors and conveyor actuators, such as e.g. driven stoppers, switches, pushers etc. with the control computer(s) (PLCs) as well as the creation of the program code for the PLCs. The corresponding costs for material, installation, commissioning and programming as well as maintenance constitute a considerable portion of the total costs of the installation, wherein the control system generally costs more than the mechanical system. The availability of staff who have specialist knowledge of PLC programming is an additional requirement.

In US 2014/0236555 A1 it is disclosed to allow real data from a logistics installation to be incorporated into a virtual model thereof in order to improve or render more realistic the virtual environment in terms of the conveying flow so as to obtain improved test results.

Furthermore, the article "Decentralized Control of a Material Flow System Enabled by an Embedded Computer Vision System" (Communications Workshops (ICC), 2011 IEEE International Conference on. 20110605 IEEE-ISBN 978-1-61284-954-6: ISBN 1-61284-954-7) discloses the use of camera-based object recognition by means of markers at the level of the decentralized controllers.

It is known from EP 2 183 175 B1 to control a conveyance technique in real time by means of optical sensors and also image sensors. However, in larger installations this involves considerable outlay for real-time processing and evaluation of the image data, in particular image recognition.

SUMMARY OF THE INVENTION

The present invention provides a way of reducing the outlay associated with image recognition despite the use thereof, and at the same time to decrease the control outlay and the installation and operational outlay for the actuators in conveyance techniques of warehouses. The object is also to increase or better utilize the performance capability of the installed conveyor equipment.

In accordance with aspects of the invention, it has been recognized that, if the real conveyance techniques in warehouses are controlled on the basis of a virtualized three-dimensional model, it is possible to reduce the burden of or the outlay for image recognition because the installation is controlled by means of the virtual model and this does not have to be fed with image data in real time but instead is checked only cyclically for adjustment purposes. Moreover, the material flow can thus be simplified by means of actuator control. The simplicity is also to increase or better utilize the performance capability of the installed conveyor equipment. Additional to this is the simplicity of increasing or exploiting the performance of the installed conveyance technique.

In the case of the method in accordance with aspects of the invention, in order to control the material flow of objects or goods being conveyed in a conveyance technique of a real warehouse, a three-dimensional model of the installation is virtualized, for which purpose the conveyance technique of the real warehouse is virtualized in a central computer, for which purpose a virtual three-dimensional model of the real conveyance technique with the dimensions of the individual conveyance technique components and their movement parameters including the actuator properties and the identity and position of the objects is stored, and the conveyance technique of the real warehouse is controlled centrally from the virtual model, images of the objects in the real conveyance technique are cyclically captured by means of sensors and the virtual model is cyclically adjusted to reality on the basis of the images taken.

Virtualization is the abstraction of physical components of the real installation, such as conveyors, actuators, objects (load carriers and load itself) as well as further hardware. By means of calibration, the virtual model and the real installation are then adapted to one another where appropriate.

The term virtualization thus refers to technologies which allow physical components of the real installation to be provided by means of software independently of their physical basis. In other words, the real installation is controlled via the virtual model, in which the actuators, conveyor equipment and objects change in terms of their position etc. in parallel with the real warehouse. These simulated changes are checked in reality merely cyclically but not necessarily continuously or even in real time, and in the event of differences the model is adjusted. For this purpose, the objects can be identified from the captured images in the central computer by means of image recognition and their position at the point in time of image capture in the real conveyance technique can be determined and the virtual model can be adjusted cyclically on the basis of the identification and position determination.

Alternatively, the captured images can be compared in the central computer to images which are calculated from the virtual model, by means of image recognition in order to establish deviations. Therefore, from the state of the model, virtual images are calculated which correspond to the real images in order to check by comparison even at image level whether deviations are present. This serves to assist image recognition and saves computing power.

The virtualized model of the real warehouse comprises on the one hand the conveyance techniques and other installations and comprises on the other the objects with their changing positions. The conveyance techniques and other installations are entered as physical model components in the virtualized model. In order to initially populate the virtual model with the data of the objects, it is possible to ascertain the position and identity of the objects from an initial image capture and/or from database information at the start time of the virtualization. Subsequently, the respective position of the objects is determined by the change in the model corresponding to the stored conveyor properties and the changes in the positions of the objects associated therewith.

In a particular embodiment, the virtual model comprises a virtual three-dimensional model of the entire warehouse including all conveyance techniques, objects and rack stores, and not only individual conveying paths or areas.

It is possible at suitable locations to install image sensors (e.g. cameras) which capture the goods being conveyed on the material flow equipment including the rack serving apparatuses and in the storage rack. The cameras transmit the images (films) cyclically to a computer. By means of ongoing image recognition, the goods being conveyed are recognized and their position is exactly determined and tracked at all times. On the basis of this information, the computer can check and adjust the virtual model of the conveyance technique including all of the goods being conveyed, including their position on the respective conveyor equipment and in the storage rack. The virtual three-dimensional model of the warehouse, including the conveyor equipment, comprises inter alia dimensions and position of the individual components and their movement parameters (speed, acceleration etc.).

The goods being conveyed (which item, which order) can likewise be identified by the evaluation of the camera images. Therefore, an adjusted model of the installation, including the goods being conveyed with all the information required for triggering actuators, is available in the computer. The computer generates from this information and the requirements of the management system (warehouse management computer, routing, objectives of the order processing etc.) commands to the actuators in order to control the material flow in a targeted manner.

Accordingly, the central computer has preferably one or a plurality of different modules: interface to the sensors, cameras for receiving the image data; preparing and processing the image data; image recognition and downstream identification and position determination of the recognised goods being conveyed; virtualised model of the real warehouse with adjusted information originating from the image recognition, relating to the identification and position determination of the goods being conveyed; interface to the warehouse management computer in order to take into account the routing and objectives of the order processing; generation of material flow control commands by means of the virtualised model for the real actuators for controlling the conveying movement of the respective goods being conveyed for placement into storage, storage, removal from storage, optionally sorting and conveyance thereof for order processing.

With the inventive control via the virtualized model, it is initially possible to relieve the burden on image recognition because, in comparison with the prior art, it does not have to operate in real time. Furthermore, it is possible to save on conventional sensors including cabling. The PLC hardware and software is dispensed with and is replaced by the new control computer. This computer has more information at its disposal, with the aid of which the material flow can be optimized. For example, the destination and the momentary position of each good being conveyed is known at all times and so the gaps in conveyance flow can be optimized and thus the performance of a conveying line can be increased. By virtue of the omission of the traditional "PLC" and thus of the fact that the new control computer can run on the same platform as the warehouse management computer (e.g. Java programming language), there is no requirement for specialist discipline (PLC programmers), with the corresponding advantages in terms of the deployment of staff.

In a particular embodiment, IP cameras, which are also called network cameras, are suitable as sensors. The sensors for image taking are arranged in the warehouse such that the field of view in which the images are taken includes introducing points, discharging points, crossings and diversion points as well as placement into storage points and removal from storage points of the goods being conveyed on the conveyance technique components.

The invention also relates to a corresponding system for controlling the material flow of objects in a distribution warehouse or a central warehouse having a central computer which is configured to provision a virtual three-dimensional model of the real conveyance technique, in which the real conveyance technique with dimensions of the individual conveyance technique components and their movement parameters including the actuator properties and the identity and position of the objects is stored, and the conveyance technique of the real warehouse is controlled centrally from the virtual model, for which purpose an interface to a warehouse management computer for exchanging data relating to the routing and objectives of the order processing of the goods being conveyed and a model for generating material flow control commands via an interface to actuators of the conveyance technique for controlling the actuators with the aid of the virtualized real-time model are provided, comprising image sensors for cyclically capturing images of the goods being conveyed in the conveyance technique, an interface between the image sensors and the central computer for providing image data in specified cyclical time intervals, wherein the central computer is equipped with a comparison device in order to adjust the virtual model cyclically to reality on the basis of the images taken. In a particular embodiment, the image sensors are arranged at points on the conveyance technique where the goods being conveyed are placed into storage, stored, removed from storage, sorted and conveyed for order processing. In a preferred embodiment, the conveyance technique is a roller conveyor or belt conveyor.

If the image sensors are IP cameras which are arranged such that their field of view includes the taking of images of introducing points, discharging points, crossings and diversion points as well as placement into storage points and removal from storage points of the goods being conveyed on the conveyance technique components, the material flow-critical points can be effectively monitored and can still be controlled even without a large number of image sensors.

It is understood that conventional sensors can also still be used in parallel, depending upon requirement.

It is also possible to provide corresponding image sensors on rack serving apparatuses etc. in the area of the storage racks of the warehouse. It is thus possible to determine the orientation of the objects or goods being conveyed in the rack and the occupancy. The field of view of the corresponding sensors can thus also include the storage racks.

The invention also comprises a corresponding computer program product, comprising commands which, when the program is executed by a computer, cause the computer to carry out the previously described method or the steps of the method to be carried out.

Further features and details of the invention will be apparent from the following description of the drawing.

BRIEF DESCRIPTION OF THE DRAWINGS

FIG. 2 shows a schematic flow diagram of the control method.

DESCRIPTION OF THE PREFERRED EMBODIMENTS

Figure 1:
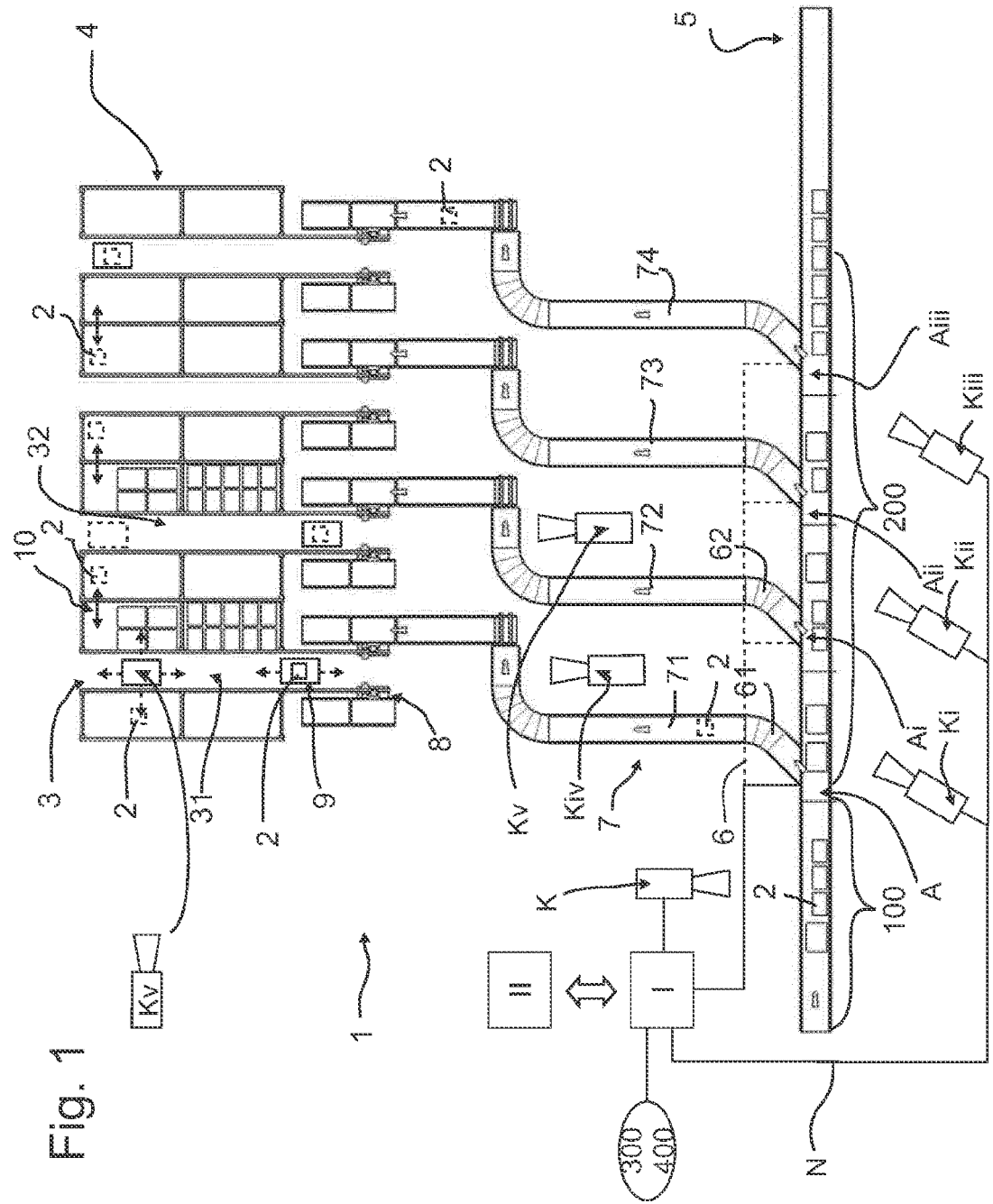
FIG. 1 shows a schematic plan view of a conveyor system and a rack store for placing packets into storage and removing packets from storage.

FIG. 1 shows a plan view of a part of a central warehouse with a conveyor system 1 for placing packets 2 into storage in storage rack aisles 3 which are formed by storage racks 4 which are arranged in parallel with and opposite each other and have a plurality of levels.

The conveyor system 1 includes a distribution path 5 which conveys packets 2 inwards and outwards. Paths 7 into and out of storage are arranged between the distribution path 5 and the storage racks 4. These paths are connected to the distribution path 5 by introducing and discharging areas 6 and are connected to the storage rack aisles 3 via goods lifts 10. Adjacent paths 71 and 72, 73 . . . into and out of storage are arranged in parallel with each other.

The packets 2 are transported by the goods lifts 8 from the into-storage paths 7 into the rack levels of the storage racks 4 or from the rack levels to the out-of-storage paths 7. The packets 2 are transported within the rack levels of the storage racks 4 via rack serving apparatuses 9. Preferably, a rack serving apparatus 9, e.g, a shuttle vehicle, moves on each rack level. The rack serving apparatus 9 is equipped with load picking-up means, e.g. telescoping arms which permit a transfer up to a transport surface of the rack serving apparatus 9 or down from a transport surface of a rack serving apparatus 9.

The method when placing packets 2 into storage will be explained hereinafter with the aid of FIG. 1.

In the region of the feed 100, images of the distribution path 5, on which e.g. a packet 2 is moved, are taken at cyclical intervals by an IP camera K. The image data from the IP camera K are communicated via a network N to a computer I and are prepared and processed so that they can be used in an image recognition module 300 for downstream identification and position determination 400 of the goods being conveyed or the packet 2 located on the distribution path 5.

Moreover, a three-dimensional model of the conveyance technique 1 is virtualized in the computer I, for which purpose a virtual model of the entire real conveyance technique 1 with the dimensions of the individual conveyance technique components and their movement parameters, including the actuator properties and storage racks etc., is stored.

This model in the computer I is cyclically adjusted with the information from the identification and position determination 400 of the recognized goods being conveyed which take place downstream of the image recognition 300, in order to ensure that the virtual model reflects the reality in the installation. Since this is not effected in real time, the requirements placed on the corresponding systems are lower. For this purpose, further IP cameras Ki, Kii, Kiii etc., of which the image data are likewise incorporated into the adjustment with the virtual model, are arranged at suitable points. The cameras K are all connected to the computer I via known network technology via power-over-Ethernet connections N.

The real conveyance technique 1 is centrally controlled with the aid of the virtualized model, for which purpose information is also incorporated with the superordinate warehouse management controller II via suitable interfaces, taking into account the routing and objectives of the order processing.

From this, the computer I generates material flow control commands for the real actuators A, Ai, Aii, Aiii etc. for controlling the conveying movement of the respective goods being conveyed or packets 2 on the distribution path 5 and also for placement into storage, storage, removal from storage, optionally sorting and conveyance thereof for order processing.

Therefore, in the present case the actuator A of the discharging area 6 is activated for the packet 2, located in the area 100, according to its speed such that the packet 2 passes onto the discharging area 61 and thus onto the path 71. For this purpose, its position and speed from the virtual model are used and then checked in a comparison unit arranged in the computer I to establish whether an adjustment is required on the basis of the real position of the goods being conveyed. The actuator A—designed as a pusher—of the discharging area 61 is thus controlled by the computer I on the basis of the virtualized model such that the packet 2 is discharged.

It is understood that the computer I or the controller running therein also controls the distribution path 5, which is designed as a roller conveyor, on the basis of the virtualized model.

A packet 2 is thus conveyed on the distribution path 5 for placement into storage and after passing through a discharging area 61 it passes via the into-storage path 71 to the goods lift 8. From the goods lift 8, the packet 2 is received by a rack serving apparatus 9 and thus placed into storage into a destination rack aisle 31 or corresponding storage rack of the aisle.

A camera Kvi is likewise provided on the rack serving apparatus 9 and takes images of the rack 4 during travel and thus permits capture of the occupancy and orientation of the packets in the rack. In this case, no light barriers or other sensors are required.

The material flow of the packet 2 is controlled solely by means of the image data obtained from the cameras K and the packets identified therefrom and the position or speed thereof. However, conventional sensors, such as light barriers or light scanners, can also be used additionally or in sections in order to combine e.g. conventional modules.

The sequence of control will be explained once again hereinafter with reference to FIG. 2.

As mentioned, image data are continuously recorded by the IP cameras K, Ki, Kii . . . (step S1) and the data from the IP cameras K, Ki, Kii . . . are communicated to the computer I via the network N (step S2). In the computer I, identification and position determination of the goods being conveyed are performed in the modules 300 and 400 from the image data (step S3). The identification is effected by means of image recognition in the module 300 on the basis of the dimensions and external features of the goods being conveyed. Communication with the warehouse management controller II provides information relating to the expected packets and their properties in order to facilitate or confirm the identification. For instance, the respective orientation can also be recognized and where appropriate a change can be instigated by the controller.

The downstream position determination in the module 400 is effected on the basis of the known location of the camera K which provides the respective image data and the speed etc. calculated from the difference images.

The comparison unit provided in the computer I is fed with these current data and cyclically checks the virtualized three-dimensional model to see that it corresponds to reality, which of course—depending upon importance—can be assumed to be the present situation within certain deviations. Therefore, it is possible to ensure at all times that the goods being conveyed in the model are also located at correct positions and also move exactly within the framework of the prediction (virtualization). If too many deviations occur, this provides a reason to check the model and/or the real installation.

In order to calculate control commands for the conveyance technique from the model, data from the warehouse management controller II are also incorporated via suitable interfaces in order to take into account the routing and objectives of the order processing. Then, from this information, the control commands for the respective actuators are calculated and communicated to the actuators (step S5).

The sequence then begins anew.

The invention claimed is:

1. A method for controlling the material flow of goods being conveyed in a conveyance technique to and from storage racks of a real warehouse by means of a virtual three-dimensional model, wherein the conveyance technique comprises a conveyor system, wherein the conveyor system comprises a plurality of components comprising;
   a distribution path that conveys goods inwards and outwards, wherein the distribution path includes a feed area; and
   conveyors arranged between the storage racks and distribution path for conveying goods into and out of storage in the storage racks;
   wherein the conveyors are connected to the distribution path by introducing areas and discharging areas, and wherein actuators are provided at the introducing areas and discharging areas for controlling the conveyance of goods to and from the conveyors;
   wherein the conveyors are connected to the storage racks via goods lifts, wherein the goods lifts are configured to transport goods from the conveyors into the storage rack for storage and are configured to transport goods from the storage racks to the conveyors for discharging to the distribution path, and wherein goods are transported to and from the goods lifts and within levels of the storage racks by rack serving apparatuses; and
   wherein cameras are provided for taking images of the goods during operation of the conveyance technique;
said method comprising:
   virtualizing the conveyance technique of the real warehouse in a central computer wherein a virtual three-dimensional model of the real conveyance technique is stored, wherein the virtual three-dimensional model includes dimensions of individual components of the conveyance technique, movement parameters of individual components of the conveyance technique, and properties of the actuators, and wherein the virtual three-dimensional model further comprises the identity, form and position of the goods being conveyed;
   cyclically capturing images of the goods with the cameras, wherein said cyclically capturing images of the goods comprises capturing images of the goods being conveyed in the real conveyance technique;
   identifying the goods from the captured images in the central computer by image recognition, wherein the form of the goods is translated into a three-dimensional model;
   determining the position of the goods from the captured images in the central computer at the point in time of the image capture in the real conveyance technique;
   controlling the conveyance technique of the real warehouse centrally from the virtual model;
   and
   cyclically adjusting the virtual model to reality on the basis of said identifying the goods and said determining the position of the goods from the captured images.

2. The method as claimed in claim 1, wherein the captured images are compared in the central computer to images that are calculated from the virtual three-dimensional model, by image recognition in order to establish deviations.

3. The method as claimed in claim 1, wherein the position, form and identity of the goods being conveyed are ascertained for the purpose of creating the virtual three-dimensional model in the central computer from an initial image capture and/or from database information at the start time of the virtualization.

4. The method as claimed in claim 1, wherein the virtual three-dimensional model is a virtual three-dimensional model of the entire warehouse including all components of the conveyance techniques, goods being conveyed and storage racks.

5. The method as claimed in claim 1, wherein the cameras communicate their captured images to the central computer via an IP network.

6. The method as claimed in claim 1, wherein the central computer has one or a plurality of different modules configured and operable for:
   interfacing to the cameras for receiving the image data;
   preparation and processing of the image data of the images;
   image recognition and downstream identification and position determination of the recognized goods being conveyed;
   virtualized modelling of the real warehouse with adjusted information originating from the image recognition, relating to the identification, form and position determination of the goods being conveyed;
   interfacing to a warehouse management computer in order to take into account the routing and objectives of the order processing and exchange of information relating to the goods being conveyed; and/or
   generating material flow control commands via the updated, virtualised model for the real actuators for controlling the conveying movement of the respective goods being conveyed for placement into storage, storage, removal from storage, optionally sorting and conveyance thereof for order processing.

7. The method as claimed in claim 1, wherein the cameras are arranged in the warehouse such that fields of views of the cameras in which the images are taken includes introducing points, discharging points, crossings and diversion points of the goods being conveyed on the components of the conveyance technique, including the storage racks.

8. The method as claimed in claim 1, wherein the cameras for taking images of the goods during operation of the conveyance technique include cameras at least for taking images at the feed area and in the area of the actuators, and wherein said cyclically capturing images of the goods comprises taking images of the goods in the feed area and in the area of the actuators.

9. The method as claimed in claim 8, wherein the cameras for taking images of the goods during operation of the conveyance technique further include cameras for taking images at the conveyors, and wherein said cyclically capturing images of the goods comprises taking images of the goods at the conveyors.

10. The method as claimed in claim 9, wherein said cyclically capturing images of the goods with the cameras further comprises capturing images of the goods at the storage racks and the rack serving apparatuses, and wherein said cyclically capturing images of the goods comprises taking images of the goods at the storage racks and the rack serving apparatuses.

11. The method as claimed in claim 1, wherein said controlling the conveyance technique of the real warehouse centrally from the virtual model comprises controlling the actuators.

12. The method as claimed in claim 1, wherein the conveyors comprise into storage conveyors and out of storage conveyors.

13. The method as claimed in claim 1, wherein the conveyors comprise roller conveyors and/or belt conveyors.

14. A system for controlling the material flow of goods being conveyed in a warehouse, wherein the warehouse includes storage racks and a real conveyance technique for conveying goods to and from the storage racks, wherein the real conveyance technique comprises a conveyor system, wherein the conveyor system comprises a plurality of components comprising;
  a distribution path that conveys goods inwards and outwards, wherein the distribution path includes a feed area; and
  conveyors arranged between the storage racks and distribution path for conveying goods into and out of storage in the storage racks;
  wherein the conveyors are connected to the distribution path by introducing areas and discharging areas, and wherein actuators are provided at the introducing areas and discharging areas for controlling the conveyance of goods to and from the conveyors;
  wherein the conveyors are connected to the storage racks via goods lifts, wherein the goods lifts are configured to transport goods from the conveyors into the storage rack for storage and are configured to transport goods from the storage racks to the conveyors for discharging to the distribution path, and wherein goods are transported to and from the goods lifts and within levels of the storage racks by rack serving apparatuses; and
  wherein cameras are provided for taking images of the goods during operation of the conveyance technique;
said system comprising:
  a central computer configured to provision a virtual three-dimensional model of the real conveyance technique, wherein the virtual three-dimensional model includes dimensions of individual components of the real conveyance technique, movement parameters of individual components of the conveyance technique, properties of the actuators, and the identity, form and position of the goods being conveyed;
  an interface to a warehouse management computer for exchanging data relating to the routing and objectives of order processing of the goods being conveyed wherein the conveyance technique of the real warehouse is controlled centrally from the virtual three-dimensional model; and
  a flow control model for generating material flow control commands via an interface to the actuators of the conveyance technique for controlling the actuators with the aid of the virtual three-dimensional model;
  cameras for cyclically capturing images of the goods being conveyed in the conveyance technique; and
  an interface between the cameras and the central computer for providing image data in specified cyclical time intervals;
  wherein the central computer is configured to adjust the virtual three-dimensional model cyclically to reality on the basis of the images taken.

15. The system as claimed in claim 14, wherein the cameras are arranged at points on the conveyance technique where the goods being conveyed are placed into storage, stored, removed from storage, sorted and conveyed for order processing, and the goods being conveyed are stored.

16. The system as claimed in claim 14, wherein the conveyors of the conveyance technique comprise a roller conveyor or a belt conveyor.

17. The system as claimed in claim 14, wherein the cameras comprise IP cameras that are arranged such that their view fields enable taking images of introducing points, discharging points, crossings and diversion points as well as placement into storage points and removal from storage points of the goods being conveyed on the components of the conveyance technique.

18. The system as claimed in claim 14, wherein the central computer comprises image recognition software configured to identify from the captured images the goods being conveyed and to determine their position at the time of image capture in the real conveyance technique and to adjust the virtual three-dimensional model cyclically with the identification and position determination of the goods being conveyed.

* * * * *